United States Patent [19]

Dekker et al.

[11] Patent Number: 5,154,334
[45] Date of Patent: Oct. 13, 1992

[54] METHOD OF CLEAVING A PLATE OF BRITTLE MATERIAL

[75] Inventors: Jacobus N. Dekker, Drachten; Maarten H. Zonneveld; Hans Galenkamp, both of Eindhoven, all of Netherlands

[73] Assignee: U.S. Philips Corporation, New York, N.Y.

[21] Appl. No.: 799,689

[22] Filed: Nov. 22, 1991

Related U.S. Application Data

[63] Continuation of Ser. No. 518,679, May 3, 1990, abandoned.

[30] Foreign Application Priority Data

May 8, 1989 [NL] Netherlands ............ 8901144

[51] Int. Cl.⁵ .................... C03B 33/09; B26F 3/06
[52] U.S. Cl. .................... 225/2; 225/93.005
[58] Field of Search ........ 225/2, 93.5, 1; 65/269, 65/271, 112

[56] References Cited

U.S. PATENT DOCUMENTS

| | | | |
|---|---|---|---|
| 2,959,507 | 11/1960 | Long | 65/269 X |
| 3,050,906 | 8/1962 | Murphy et al. | 225/93.5 |
| 3,554,722 | 1/1971 | Harvey et al. | 65/112 X |
| 3,739,963 | 6/1973 | Michalik | 225/2 |
| 4,113,162 | 8/1978 | Boehm et al. | 225/93.5 X |
| 4,670,636 | 6/1987 | Taub et al. | 225/93.5 X |

FOREIGN PATENT DOCUMENTS 2813302 9/1979 Fed. Rep. of Germany.

Primary Examiner—Douglas D. Watts
Assistant Examiner—Rinaldi Rada
Attorney, Agent, or Firm—Norman N. Spain

[57] ABSTRACT

The invention relates to a method of asymmetrically cleaving a plate (1) of brittle material, in which a thermal load and a mechanical load are provided on the plate (1) and the plate (1) is cleft along a desired cutting line (7).

2 Claims, 2 Drawing Sheets

METHOD OF CLEAVING A PLATE OF BRITTLE MATERIAL

This is a continuation of application Ser. No. 07/518,679 filed May 3, 1990 now abandoned.

BACKGROUND OF THE INVENTION

The invention relates to a method of cleaving a plate of brittle material, in which a thermal load is applied to at least one major surface of a plate to be cleft, one side of which plate is provided with a crack initiation which serves as the beginning of a crack. As a result the application of the thermal load stresses are produced in the plate, which, to be formed, cause a crack at right angles to the major surface along a desired cutting line and starting from the crack initiation.

A method of the kind to which the present invention relates is known from DE-28,13,302 C2. In this known method, a side of a plate of flat glass is provided with a crack initiation and the plate is heated in one of two consecutively arranged regions symmetrical to the desired cutting line and is cooled in the other of these regions, as a result of which due to temperature gradients thermal stresses are produced in the plate, which cause a crack starting from the crack initiation. When the plate is cleft symmetrically, the crack follows the desired cutting line. However, if the plate is cleft asymmetrically, the crack deviates from the desired cutting line.

SUMMARY OF THE INVENTION

The invention has for its object to provide a method of the kind described above, by means of which a plate of brittle material is cleft accurately and rapidly along a desired cutting line. According to the invention, this object is mainly achieved while a thermal load is applied on the desired cutting line and starting from the crack initiation, a mechanical load is provided transverse to the plane of the plate in such a manner that the plate is cleft asymmetrically along the desired cutting line.

When a plate is cleft asymmetrically by means of the method known from DE 28,13,302 C2, two kinds of deviations occur: lateral deviations, i.e. deviations of the crack with respect to the desired cutting line in a major surface of the plate, and squareness deviations, i.e. deviations of the crack with respect to a plane starting from the desired cutting line and transverse to a major surface of the plate. The cause of these deviations is mechanical asymmetry.

A brief explanation of the cause of the cause of the lateral deviations is now presented. When a plate is cleft asymmetrically, the plate is subdivided into two strips having different widths. During the cleaving operation, material along the crack has a higher temperature than the surrounding material and consequently the thermal expansion of the material along the crack is larger than that of the surrounding material. As a result, the strips of material warp on either side of the crack: the strips bend away from the crack. However, the narrow strip bends over a larger distance than the wide strip due to the fact that the latter is connected to a larger quantity of cold material and is thus impeded in bending away from the crack. The stress in the material close to the crack tip in the direction of the crack is consequently larger on the side of the wider strip; the stress condition is therefore asymmetrical. Ultimately, a shear load is obtained on the material immediately in front of the crack tip. As a result, the direction of the crack will change towards the narrow strip and the crack will no longer follow the desired cutting line. According as the lateral deviation of the crack increases, the shear load decreases until with a sufficient lateral deviation the shear load becomes zero and the stress condition around the crack tip is symmetrical.

The value of the lateral deviation is determined by a large number of parameters, such as: thermal and mechanical properties of the material, power, shape and dimension of the heat source, and geometric parameters, such as dimensions of the plate and the position of the crack in the plate.

The squareness deviation is obtained when the thermal load is provided on only a single major surface of the plate to be cleft. The heated or cooled zone is larger on the other major surface due to diffusion. The lateral deviation is thus different on the two major surfaces, which results in squareness deviations. Both deviations are therefore due to the difference in width and hence in rigidity of the strips of material on either side of the crack, i.e. to mechanical asymmetry. These deviations occur both in rectilinear cutting and in contour cutting.

By means of the method according to the invention, the mechanical load is provided in such a manner that the stresses in the material of the plate are symmetrical close to the crack tip when the crack tip lies on the desired cutting line. Thus, no lateral deviations and squareness deviations occur. The plate is cleft asymmetrically along the desired cutting line. The thermal load can be provided on the plate by a spot-shaped or linear heat source.

In a preferred embodiment of the method according to the invention, the mechanical load is provided in that a force is exerted on the plate. As described above, when a plate is cleft asymmetrically, the narrow strip will bend away from the crack over a larger distance than the wide strip. As a result, the stresses around the crack tip become asymmetrical. When now a force is exerted on the strips in the plane of the plate such that the narrow strip is bent back to the crack over a larger distance than the wide strip, the stresses around the crack tip become symmetrical. The force can consist of spot loads, which during the operation of cleaving the plate terminate with a constant value and direction on fixed points of the plate. However, the spot loads may also vary during the operation of cleaving the plate in value, direction and termination point. The force may also consist partly or entirely of line loads. Another possibility is that the force is applied in that a frictional force is exerted on the surface of the plate.

In a further preferred embodiment of the method according to the invention, the mechanical load is provided by strengthening material temporarily secured to the narrow strip, as a result of which the mechanical properties of the narrow strip are changed and the stresses around the crack tip are symmetrical when the crack tip lies on the desired cutting line. This can be achieved by a suitable choice of the width, the thickness and the mechanical properties of the strengthening material. The strengthening material may be secured to the narrow strip, for example, by means of glue. The glue connection should be chosen so that it is sufficiently strong to pass through the stresses occurring during the cleaving operation, but can be simply interrupted again after the cleaving operation. The principle for the two forms of stress is the same: changing the stresses in the plate so that the stress condition around the crack tip is symmetrical when the crack tip lies on the desired cutting line.

In the figures, the deformations of the plates are exaggerated.

Figure 1:
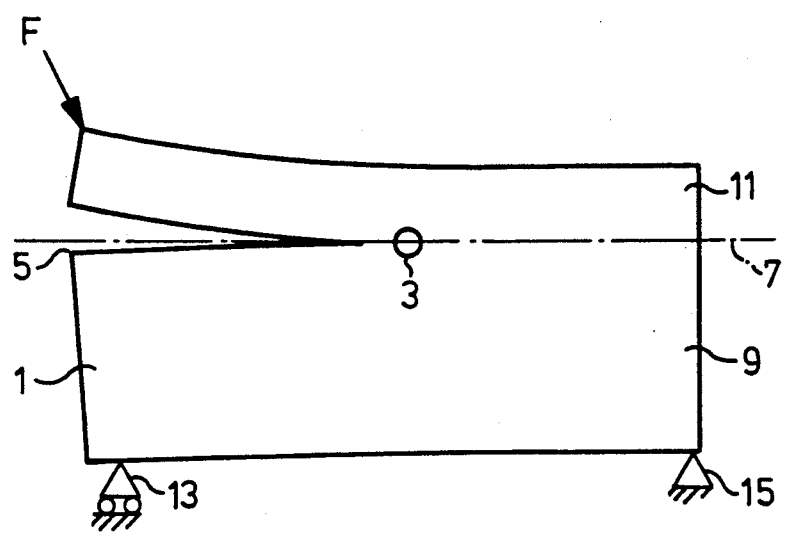
FIG. 1 is a cross-sectional view showing the provision of a mechanical load on a corner of the narrow strip.

In FIG. 1, a plate 1 of brittle material is shown, which is cleft by means of a spot-shaped heat source 3, for example a laser, starting from a crack initiation 5 along the desired cutting line 7. The spot-shaped heat source 3 is moved over the plate 1 along the desired cutting line 7. The plate 1 is cleft asymmetrically into a wide strip 9 and a narrow strip 11. The wide strip 9 is supported during the cleaving operation at two points 13, 15. A constant force F is exerted on a corner of the narrow strip 11. The value and the direction of the force F are determined empirically or by calculation. Instead of a spot-shaped heat source 3, use may also be made of a linear heat source.

Figure 2:
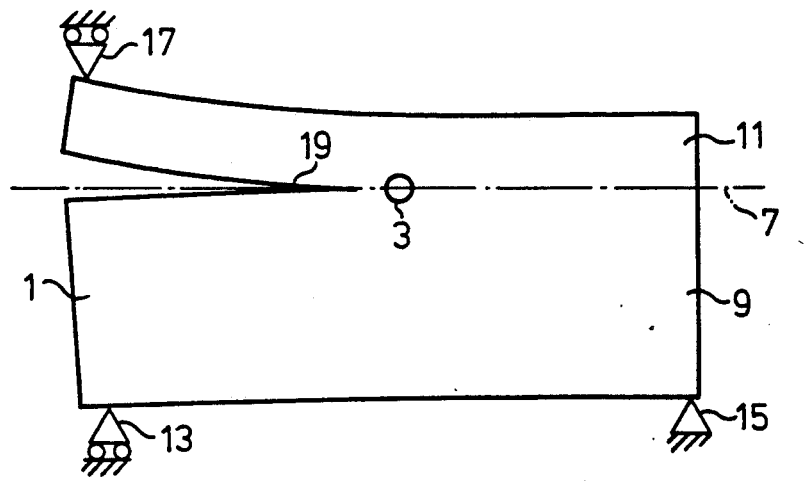
FIG. 2 is a cross-sectional view showing the provision of a mechanical load by constraint.

In FIG. 2, a plate 1 of brittle material is cleft asymmetrically in the same manner as in FIG. 1. The mechanical load is now provided by constraint, that is to say that the plate 1 is constrained by fixed supports 13, 15 and 17 in the shape it can assume by bending of the strips 9, 11. The position of the supports is determined empirically or by calculation. Also in this case, instead of a spot-shaped heat source 3 a linear heat source may be used.

Figure 3:
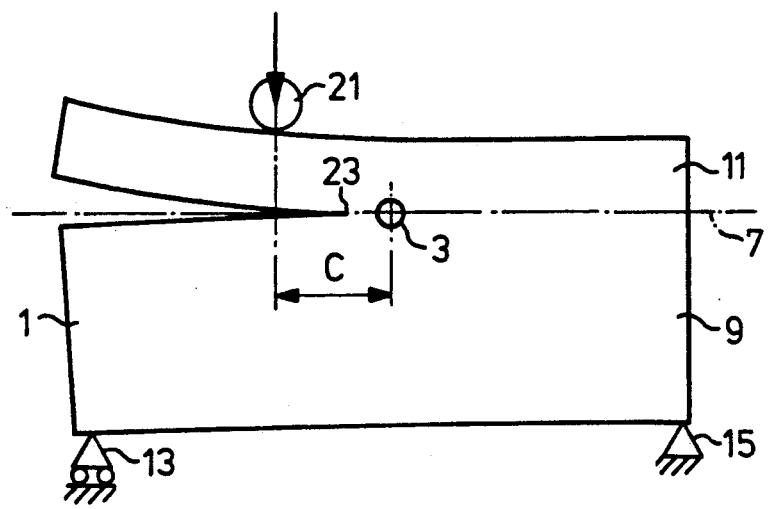
FIG. 3 is a cross-sectional view showing the provision of a constant mechanical load with respect to the crack tip.
Figure 4:
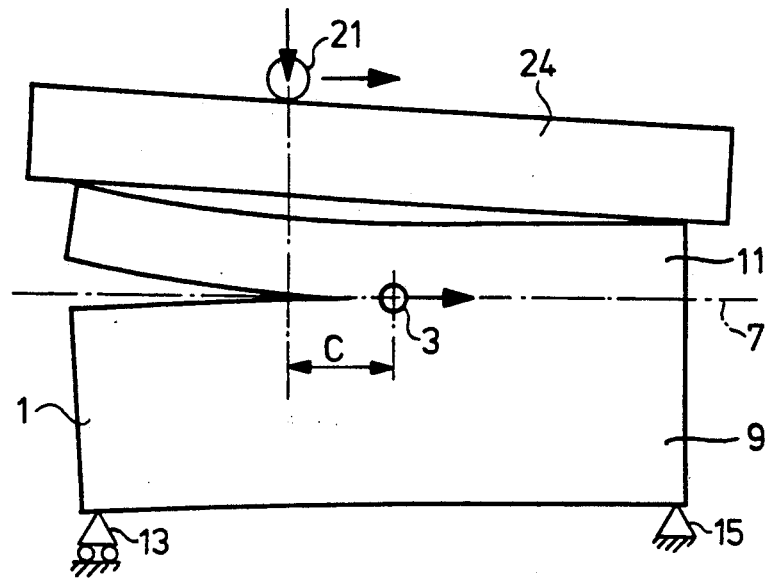
FIG. 4 is a cross-sectional view showing the provision of a mechanical load on both corners of the narrow strip.

In FIG. 3, as in the preceding examples, a plate 1 of brittle material is cleft asymmetrically. The mechanical load is provided by a roller 21, which is forced by means of a spring or a pneumatic cylinder (not shown) against the edge of the narrow strip. The distance C between the roller 21 and the spot-shaped heat source 3 is kept constant. As a result, a constant load is obtained with respect to the crack tip 23. Even more favorable results are attained if the roller 21 runs over a rigid strip formed of a metal bar 24, which engages the edge of the plate 1. This example is shown in FIG. 4. These two methods are suitable only in combination with a spot-shaped heat source 3.

Applying the embodiment shown in FIG. 4a a plate of lime glass was cleft with a beam of a $CO_2$-laser with a spot-diameter of 4 mm and a power of 15 Watt. The plate had a width of 37 mm, a length of 87 mm and a thickness of 1 mm. The plate was provided with a crack initiation in a side of 37 mm. The crack initiation was situated 10 mm from a first long side of 87 mm. The beam was moved over the plate with a speed of 5 mm/sec. The laser beam started at the crack, initiation and was moved parallel to the long (87 mm) sides of the plate. A metal bar 24 with a width of 15 mm, a length of 100 mm and a thickness of 5 mm laid against the first long side. The second long side rested against two pins. The broad side without the crack initiation also rested against a pin (not shown). On the distance C, whereby C was 18 mm, the roll was pressed against the metal bar 24 with a force of 40 Newton. The roll was moved simultaneously with the same speed as the laser beam along the plate. The plate was severed along the desired line. The maximum lateral deviation was 0.2 mm. Without the use of the bar 24, the maximum lateral deviation would have been 0.75 mm.

Figure 5:
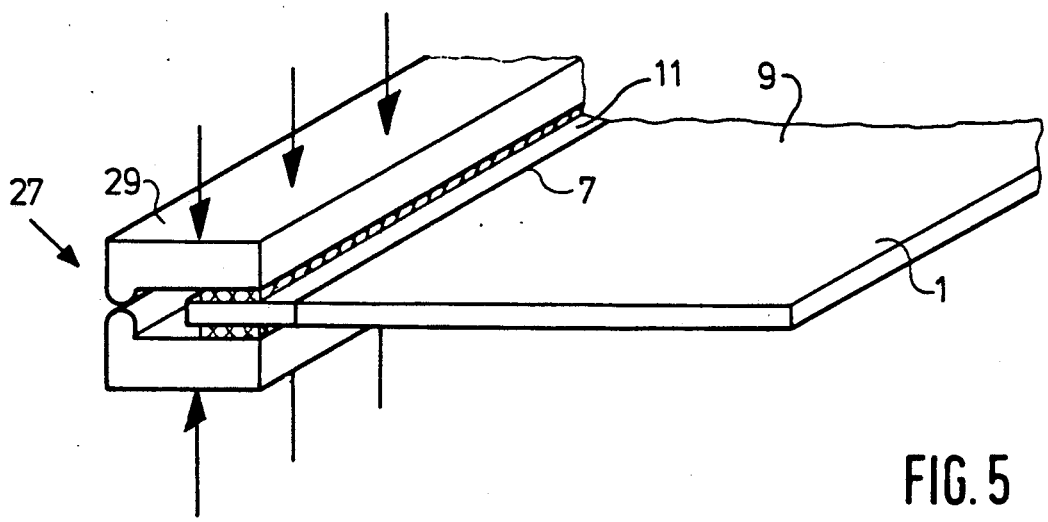
FIG. 5 a diagrammatic view of the provision of a mechanical load by clamping the narrow strip.

In FIG. 5 the mechanical load is provided on the plate 1 by exerting a frictional force on the surface of the narrow strip 11. The narrow strip is clamped in a comparatively rigid clamping device 27. The clamping pieces 29 should be sufficiently rough and the clamping force should be sufficiently great. This may be obtained, for example, by coating a steel clamp with rubber. This material yields a high friction with many materials, inter alia with glass. With a satisfactory dimensioning of the rubber and the clamping force, a mechanical symmetry will occur at the crack tip. This method is suitable for use in combination both with a spot-shaped heat source and with a linear heat source.

Figure 6:
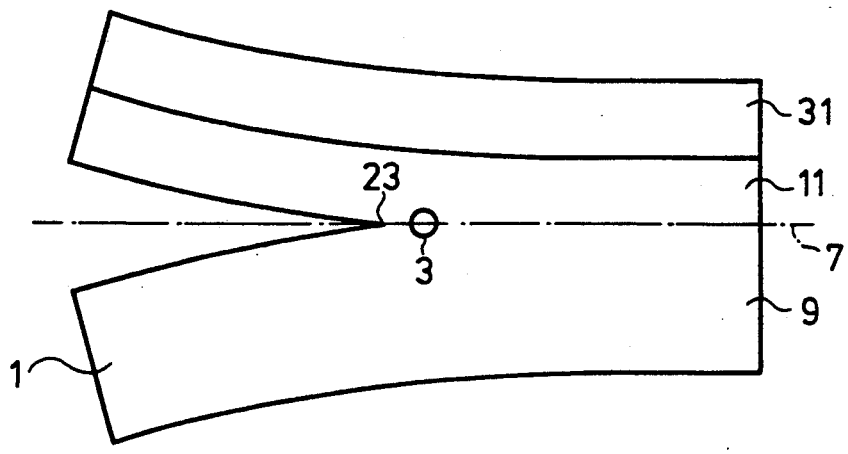
FIG. 6 is a cross-sectional view showing the provision of a mechanical load by securing strengthening material to the narrow strip.

In FIG. 6, the mechanical load is provided on the plate 1 by temporarily securing strengthening material to the narrow strip 11. In the embodiment shown, a strip of strengthening material 31 is glued to the narrow strip 11. By a suitable choice of width, thickness and mechanical properties of the strip, the load around the crack tip 23 is symmetrical. After cleaving, the strip of strengthening material 31 is removed from the narrow strip 11. The strip 31 can be used again. Also in this method, a spot-shaped heat source 3 or a linear heat source may be used. The strengthening material may also be secured to the plate by means of two strips glued to the major surfaces of the narrow strip.

Alternatively, the line glass plate as described above can be severed as follows. A bar of aluminum with a width of 17 mm, a length of 87 mm and a thickness of 1 mm is sealed with a cyano-acrylate glue to the first long side of the plate. The plate was severed along the desired line. Neither lateral, nor squareness deviations appeared.

Various kinds of materials can be cleft by means of the methods described. However, the material should be a brittle material, such as, for example, glass or silicon. A great advantage is that during cleaving no splitters and chips are formed, which could damage the surfaces of the narrow strip. As crack initiation, a scratch or an unevenness provided in the side of the material may be used. The major surface of the plate to be cleft may be either flat or curved.

We claim:

1. A method of cleaving a plate of brittle material, said method comprising providing one edge of said plate, which edge is perpendicular to a major surface thereof, with an initiation of a crack to be formed along a desired cutting line in the plane of said major surface, applying a thermal load starting from said initiation and on said desired cutting line thereby forming stresses in said plate as a result of which a crack is formed along said desired cutting line, while applying a mechanical load to edges of said plate extending in the same direction and transverse to said plane, said mechanical load exerting a force in said plane in a direction transverse to the desired cutting line, thereby preventing formation of lateral and squareness deviations of said crack and said crack being positioned so as to cleave said plate asymmetrically along said desired cutting line.

2. A method as claimed in claim 1 characterized in the mechanical load is provided by temporarily securing strengthening material to the plate.

* * * * *